United States Patent
Visioli et al.

(10) Patent No.: US 8,221,866 B2
(45) Date of Patent: Jul. 17, 2012

(54) IONOMER AND ARTICLE THEREWITH

(75) Inventors: Donna Lynn Visioli, Lower Gwynedd, PA (US); Gregory E. Hindman, Virginia Beach, VA (US)

(73) Assignee: E I du Pont de Nemours and Company, Wilmington, DE (US)

( * ) Notice: Subject to any disclaimer, the term of this patent is extended or adjusted under 35 U.S.C. 154(b) by 747 days.

(21) Appl. No.: 12/266,989

(22) Filed: Nov. 7, 2008

(65) Prior Publication Data

US 2009/0123689 A1 May 14, 2009

Related U.S. Application Data

(60) Provisional application No. 61/002,561, filed on Nov. 9, 2007.

(51) Int. Cl.
- *B32B 27/36* (2006.01)
- *B32B 27/30* (2006.01)
- *C08F 20/08* (2006.01)
- *C08F 20/04* (2006.01)

(52) U.S. Cl. .... 428/95; 428/480; 525/327.4; 525/329.5; 525/329.7; 525/330.3

(58) Field of Classification Search .................. None
See application file for complete search history.

(56) References Cited

U.S. PATENT DOCUMENTS

| | | | |
|---|---|---|---|
| 5,531,849 A | 7/1996 | Collins | |
| 6,253,526 B1 | 7/2001 | Murphy | |
| 6,777,472 B1 | 8/2004 | Statz | |
| 6,815,480 B2 * | 11/2004 | Statz et al. | 524/322 |
| 6,872,445 B2 | 3/2005 | Vinod | |
| 7,438,940 B2 | 10/2008 | Morris | |
| 7,960,017 B2 * | 6/2011 | Pesek et al. | 428/220 |
| 2004/0137191 A1 | 7/2004 | Beren | |
| 2005/0148725 A1 * | 7/2005 | Statz et al. | 524/523 |
| 2007/0289693 A1 * | 12/2007 | Anderson et al. | 156/99 |

FOREIGN PATENT DOCUMENTS

| | | |
|---|---|---|
| WO | 200127382 A1 | 4/2001 |
| WO | 2007/044657 A2 | 4/2007 |

* cited by examiner

*Primary Examiner* — John J Figueroa

(57) ABSTRACT

A carpet cushion has attached thereto or thereon a layer of polymer composition comprising, consisting essentially of, consisting of, or produced from a fatty acid-modified ionomer and optionally blended or coextruded with an ethylene-containing polymer wherein the ionomer comprises, consists essentially of, consists of, or is produced from an ethylene copolymer and a fatty acid.

22 Claims, No Drawings

IONOMER AND ARTICLE THEREWITH

This application claims priority to U.S. provisional application Ser. No. 61/002,561 filed Nov. 9, 2007; the entire disclosure of which is incorporated herein by reference.

The invention relates to an ionomer composition comprising one or more fatty acid or salt thereof and to an article therewith.

BACKGROUND OF THE INVENTION

Carpet generally has a cushion foam layer (also known as carpet underlay or pad) beneath a backing layer from which yarn strands extend. The cushion absorbs foot traffic and makes carpet feel better, last longer. Better quality cushion blocks moisture, fights stains and odors, minimizes sound transfer between rooms, provides thermal insulation and increases air flow between the floor and your carpet for better, more efficient vacuuming. Carpet cushion can include urethane foam, jute, synthetic fiber, felt, foam rubber, or sponge rubber. Urethane foam, bonded or rebonded, is probably the most popular cushion and is made from recycled polyurethane and can be conventional, high-resilience, or modified urethane.

Some commercial variants available are a combination of carpet cushion and polymeric film adhered to the surface. The polymeric layer can provide in some cases a total barrier to moisture incursion into the cushion itself, and subsequently the sub-floor. The benefit of this barrier is to provide better cleanability of the carpet by making it easier to remove the entire spill from the carpet. However, it is highly desirable that the moisture can be transmitted or permeable to the air thereby depleting the moisture content and preventing microbial growth in the cushion.

Moreover, polymers used in carpet cushion are generally petrochemical-based. There is a need to develop a carpet cushion that may be bio-based or environmentally friendly for recycle or renewability.

SUMMARY OF THE INVENTION

A carpet cushion comprises or has attached thereto or thereon a film or sheet layer comprising, consisting essentially of, consisting of, or produced from a fatty acid-modified ionomer, optionally coextruded or blended with an ethylene-containing polymer. The term "carpet" includes both carpet and rug known to one skilled in art

DETAILED DESCRIPTION OF THE INVENTION

Trademarks are shown in capital letter.

The term "produced from" is an open-ended term meaning that it does not exclude any elements that are not recited. For example, when a composite comprises or is produced from an acid copolymer and a fatty acid, the composition may comprise the acid copolymer and the fatty acid if the acid copolymer does not react with the fatty acid. If the acid copolymer reacts with the fatty acid to produce another entity, then the composition is produced from the acid copolymer and the fatty acid because it would be incorrect if there is little or no acid copolymer remaining after the reaction.

The carpet disclosed herein can be any commercial carpet.

The fatty acid-modified ionomer can be derived from an ethylene acid copolymer. The acid copolymer can comprise, consist essentially of, or consist of, repeat units derived from ethylene, an unsaturated carboxylic acid or a $C_{3-8}$ α,β-ethylenically unsaturated carboxylic acid, and optionally a softening monomer. The carboxylic acid can include (meth)acrylic acid, maleic acid, fumaric acid, itaconic acid, maleic anhydride, fumaric anhydride, maleic acid (maleic half esters) including esters of $C_1$ to $C_4$ alcohols (e.g., methyl, ethyl, n-propyl, isopropyl and n-butyl alcohols), or combinations of two or more thereof. (Meth)acrylic acid includes acrylic acid, methacrylic acid, or combinations thereof. The softening monomer makes the copolymer less crystalline and can include alkyl(meth)acrylate where the alkyl has 1-8 carbon atoms. (Meth)acrylate means methacrylate, acrylate, or combinations thereof. An example of the acid copolymers is E/X/Y copolymer where E is ethylene, X is the carboxylic acid, and Y is the softening comonomer; X can be present in 3-30 (4-25 or 5-20) wt. % of the polymer, and Y in 0-30 (3-25 or 10-23) wt. % of the polymer.

The acid copolymers may also include repeat units derived from one or more comonomers such as vinyl acetate, (meth)acrylate, or combinations of two or more thereof.

An example of acid copolymer can be described as E/X/Y copolymer where E is ethylene, X can be at least one unsaturated carboxylic acid disclosed above, and Y is a softening comonomer such as alkyl acrylate, alkyl methacrylate, or combinations thereof. X can be present from about 3 to about 30, 4 to 25, or 5 to 20, weight % of the E/X/Y copolymer, and Y is from 0 to about 35, 0.1 to 35, or 5 to 30, weight % of the E/X/Y copolymer.

Examples of acid copolymers include ethylene(meth)acrylic acid copolymers, ethylene(meth)acrylic acid n-butyl (meth)acrylate copolymers, ethylene(meth)acrylic acid iso-butyl(meth)acrylate copolymers, ethylene(meth)acrylic acid tert-butyl(meth)acrylate copolymers, ethylene(meth)acrylic acid methyl(meth)acrylate copolymers, ethylene(meth)acrylic acid ethyl(meth)acrylate copolymers, ethylene maleic acid and ethylene maleic acid monoester copolymers, ethylene maleic acid monoester n-butyl(meth)acrylate copolymers, ethylene maleic acid monoester methyl(meth)acrylate copolymers, ethylene maleic acid monoester ethyl(meth)acrylate copolymers, or combinations of two or more thereof such as NUCREL® commercially available from E. I. du Pont de Nemours and Company, Wilmington, Del. (DuPont).

The acid copolymers can be produced by any methods known to one skilled in the art such as that disclosed in U.S. Pat. No. 5,028,674 . Because such methods are so well known, the description of which is omitted herein for the interest of brevity.

Ionomers are prepared from acid copolymers as by partially or fully neutralizing one or more acid copolymers with, e.g., an alkali metal or an alkaline earth metal ion. The neutralization can be about 15 to about 80%, about 50 to about 75%, about 60 to about 100%, or 100% of the acid moiety of the acid copolymer. Examples of metal ions include lithium, sodium, potassium, magnesium, calcium, or zinc, or combinations of two or more thereof.

The fatty acid can include aliphatic, mono-functional (saturated, unsaturated, or multi-unsaturated) fatty acids, such as those having fewer than 36 carbon atoms. Salts of these fatty acids may be employed. The salts may include the barium, lithium, sodium, zinc, bismuth, potassium, strontium, magnesium, calcium, or combinations of two or more thereof or may be the same as those used to neutralize the acid copolymer.

The fatty acids (and salts) may be melt-blended with the acid copolymer or ionomer. At 100% neutralization (all acid in copolymer and fatty acid neutralized), fatty acids with lower carbon content can be used including $C_4$ to less than $C_{36}$, $C_6$ to $C_{26}$, $C_6$ to $C_{18}$, or $C_6$ to $C_{12}$, fatty acids. Examples of fatty acids include caproic acid, caprylic acid, capric acid, lauric acid, stearic acid, behenic acid, erucic acid, oleic acid, linoelic acid, or combinations of two or more thereof.

Neutralization of acid copolymers and fatty can be carried out concurrently or subsequently with melt blending. The fatty acid-modified ionomer can be produced by melt-blending an acid copolymer or ionomer thereof with one or more fatty acids disclosed above followed by combining the melt blend with one or more metal ion sources. The amount or the ion source is the amount that can produce the desired degree of neutralization disclosed above. Melt blending is well known to one skilled in the art (e.g., a salt and pepper blend of the components can be made and the components can then be melt-blended in an extruder). Also, a Werner & Pfleiderer twin screw extruder can be used to neutralize the acid copolymer and the fatty acid at the same time.

The fatty acid-modified ionomer may have at least about 70% (alternatively at least about 75%, at least about 80%, at least about 85%, at least about 90%, or at least 95%) or even about 100% of its total acid moiety (from the acid copolymer and fatty acid) to be neutralized.

The resulting thermoplastic fatty acid-modified ionomer composition comprises or consists essentially of a fatty acid (or salt) and an ionomer. A commercial example of such fatty acid-modified ionomer is available as HPF100 from DuPont.

The composition may include from about 30 to about 70, about 30 to about 60, about 35 to about 60, about 40 to about 55, about 40 to about 50 weight %, or about 50 weight %, based on the composition, of one or more additional polymer. Alternatively, the composition can comprise about 1 to about 70, about 2 to about 60, or about 5 to about 50 wt % of ethylene-containing polymer.

Also, the composition may further include about 0.1 to about 20%, about 2 to about 12, or about 1 to 5% by weight (of the composition) an additive including pigment ($TiO_2$ and other compatible colored pigments), dye, flake, plasticizer, adhesion promoter, filler (e.g., calcium carbonate, barium sulfate, and/or silicon oxide), nucleating agent (e.g., $CaCO_3$, ZnO, $SiO_2$, or combinations of two or more thereof), rubber (to improve rubber-like elasticity, such as natural rubber, SBR, polybutadiene, and/or ethylene propylene terpolymer), stabilizer (e.g., antioxidants, UV absorbers, and/or flame retardants), processing aids, or combinations of two or more thereof. Antioxidant can also include phenolic antioxidants such as IRGANOX from Ciba Geigy Inc. (Tarrytown, N.Y.).

For example, the composition may comprise a surface modifying additive such as the commercially available CONPOL from DuPont.

Ethylene-containing polymers include polyethylene (PE) homopolymers and copolymers such as high density polyethylene, low density polyethylene, linear low density PE, very low PE or ultra-low density PE, metallocene PE; ethylene propylene copolymers; ethylene/propylene/diene monomer terpolymers; and ethylene copolymers derived from copolymerization of ethylene and at least one comonomer selected from the group consisting of alkyl(meth)acrylate, vinyl acetate, carbon monoxide (CO), maleic anhydride, maleic acid derivatives, such as maleic esters, or combinations of two or more thereof.

PE homopolymers and copolymers useful for the compositions described herein can be prepared by a variety of well known methods such as the Ziegler-Natta catalyst polymerization (U.S. Pat. Nos. 4,076,698 and 3,645,992), metallocene catalyzed polymerization, Versipol® catalyzed polymerization and by free radical polymerization.

The densities of suitable PE range from about 0.865 g/cc to about 0.970 g/cc.

Ethylene copolymers having small amounts of a diolefin component such as butadiene, norbornadiene, hexadiene and isoprene are also generally suitable. Terpolymers such as ethylene/propylene/diene monomer are also suitable.

Ethylene-containing polymers may also include a copolymer comprising, consisting essentially of, or consisting of repeat units derived from ethylene and vinyl acetate, alkyl (meth)acrylate, CO, or combinations of two or more thereof.

Ethylene vinyl acetate copolymer includes copolymers derived from the copolymerization of ethylene and vinyl acetate or copolymers derived from the copolymerization of ethylene, vinyl acetate and an additional comonomer. The amount of the vinyl acetate comonomer in ethylene vinyl acetate copolymers can be about 1 to about 45 weight % of the total copolymer. For example, an ethylene vinyl acetate copolymer may have 2 to 45 or 6 to 30, weight % derived from vinyl acetate. The ethylene vinyl acetate copolymer may optionally be modified by methods well known in the art, including modification with an unsaturated carboxylic acid or its derivatives, such as maleic anhydride or maleic acid. The ethylene vinyl acetate copolymer may have a melt flow rate, measured in accordance with ASTM D-1238, of from 0.1 to 60 g/10 or 0.3 to 30 g/10 minutes. A mixture of two or more different ethylene vinyl acetate copolymers can be used.

Ethylene alkyl(meth)acrylate copolymer includes copolymer of ethylene and at least one alkyl(meth)acrylate, the alkyl moiety contains from 1 to 12 or 1 to 4 carbon atoms. Ethylene/methyl acrylate means a copolymer of ethylene and methyl acrylate (EMA), ethylene/ethyl acrylate means a copolymer of ethylene and ethyl acrylate (EEA) and ethylene/butyl acrylate means a copolymer of ethylene and butyl acrylate (EBA).

Alkyl(meth)acrylate comonomer incorporated into ethylene copolymers can vary from about 2 or 5 to about 40 weight % of the total copolymer. The alkyl(meth)acrylate comonomer can have a concentration range of (meth)acrylate monomer from 5 to 40, or 10 to 35, weight % in the ethylene alkyl(meth)acrylate copolymer. Ethylene alkyl(meth)acrylate copolymers can be prepared by processes well known in the polymer art using either autoclave or tubular reactors. The copolymerization can be run as a continuous process in an autoclave: ethylene, the alkyl(meth)acrylate, and optionally a solvent such as methanol (e.g., U.S. Pat. No. 5,028,674) are fed continuously into a stirred autoclave such as disclosed in U.S. Pat. No. 2,897,183, together with an initiator, the disclosures of which are incorporated herein by reference and the description of which is omitted herein for the interest of brevity.

Tubular reactor produced ethylene alkyl(meth)acrylate copolymer can be distinguished from the autoclave produced ethylene/alkyl(meth)acrylate as known in the art. The "tubular reactor produced" ethylene alkyl(meth)acrylate copolymer denotes an ethylene copolymer produced at high pressure and elevated temperature in a tubular reactor or the like, wherein the inherent consequences of dissimilar reaction kinetics for the respective ethylene and alkyl(meth)acrylate comonomers is alleviated or partially compensated by the intentional introduction of the monomers along the reaction flow path within the tubular reactor. Such a tubular reactor copolymerization produces a copolymer having a greater relative degree of heterogeneity along the polymer backbone (a more blocky distribution of comonomers), tends to reduce the presence of long chain branching, and produces a copolymer characterized by a higher melting point than one produced at the same comonomer ratio in a high pressure stirred autoclave reactor. Tubular reactor produced ethylene/alkyl (meth)acrylate copolymers are stiffer and more elastic than autoclave produced ethylene/alkyl(meth)acrylate copolymers. See, e.g., U.S. Pat. Nos. 3,350,372, 3,756,996, and 5,532,066.

Tubular reactor produced ethylene/alkyl acrylate copolymers are commercially available as ELVALOY® from DuPont.

The composition may be produced by a number of processes, such as compression molding, injection molding, or hybrids of extrusion and molding. For example, a process can comprise mixing the ionomer and Ethylene-containing polymer under heat to form a melt, along with any additives, to achieve a substantially homogeneous compound. The ingredients may be mixed and blended by any means known in the art such as with a Banbury, intensive mixers, two-roll mill, and extruder. Time, temperature, shear rate may be regulated to ensure optimum dispersion. An adequate temperature may be desired to insure good mixing of polymers and the mixing or dispersion of other ingredients. The polymers can form a uniform blend when blended at temperatures of about 60° C. to about 250° C., or about 70° C. to about 200° C., or about 70° C. to about 150° C. or about 80° C. to about 130° C.

Optionally, polymers can be melt-blended in an extruder at a temperature up to about 250° C. to allow potentially good mixing. The resultant mixture can be then compounded with the ingredients disclosed above.

After mixing, shaping can be carried out. Sheeting rolls or calendar rolls can be often used to make appropriately dimensioned sheets for foaming. An extruder may be used to shape the composition into pellets.

A film (including multilayer film) can be made from the composition by melt-processing using known processes such as coating, brushing, dipping, spraying, co-extrusion, sheet extrusion, extrusion casting, extrusion coating, thermal lamination, blown film methods, powder coating and sintering, or any known processes. Because the processes for making films are well known to one skilled in the art, the description is omitted herein for the interest of brevity. The film can be about 1 to about 500, about 1 to about 250, about 2 to about 200, about 5 to about 150, or about 10 to about 100μ thick.

The polymer composition comprising the fatty acid-modified ionomer, whether it is blended with an ethylene-containing polymer, can also be a layer of film or sheet and coextruded with the ethylene-containing polymer to produce a multilayer film or sheet. Coextrusion is well known to one skilled in the art and the description of which is omitted for the interest of brevity.

The polymer composition comprising fatty acid-modified ionomer film, whether blended or coextruded with an ethylene-containing polymer, can be pigmented for appearance and lower coefficient of friction thereby simplifying carpet over the cushion.

A film or sheet or coating of the polymer composition may have a water vapor transmission rate (WVTR) measured for a film of 1 mil (0.0254 mm) in thickness according to ASTM E96 of at least about 10, about 15, about 25, or about 50 g/m$^2$/24 hours, when measured at 38° C. and 100% relative humidity (RH). The film or sheet also may be sufficiently durable to maintain liquid impermeability under a pressure of at least eight pounds per square inch (0.56 kg/m$^2$) as measured by a Modified Mullen Bursting Strength Test. That is, the carpet cushion does not absorb liquid deposited onto the film or sheet or coating layer from above the upper surface, but permits moisture from below the lower surface of the cushion evaporate to the air.

The film or coating of the polymer composition may also be permeable to air measured as OTR (O$_2$ transmission rate), at 1 mil thickness, of at least 1,000, or 2,000, or 4,000, or 6,000 cc/m$^2$-day. The OTR may be measured using a Mocon OX-TRAN 2/21 at a given temperature and relative humidity such as at 38° C. and 50% RH. Depending on the thickness, the film or coating may have OTR greater than, alternatively greater than 8,000 cc/m$^2$-day, greater than 10,000 cc/m$^2$-day, greater than 15,000 cc/m$^2$-day, greater than 20,000 cc/m$^2$-day, greater than 25,000 cc/m$^2$-day, greater than 30,000 cc/m$^2$-day, or greater than 35,000 cc/m$^2$-day.

Many previous permeable membranes are microporous; that is, they are permeable due to the presence of microscopic pores through which vapor can pass. The composition disclosed herein can be formed into a monolithic membrane that functions as a selectively permeable barrier. Monolithic membranes, in contrast to microporous membranes, have high water-entry pressure and are waterproof and liquidproof and can provide good barriers to liquid water while still allowing permeability to water vapor under appropriate conditions. Monolithic membranes are also excellent in stopping draft flow to help minimize heat loss. A monolithic membrane can also function as a barrier to odors and possess better tear strength compared to microporous membranes.

A product can comprise or be produced from a carpet cushion (or pad), coated, laminated, coextruded, or applied with a barrier layer comprising the fatty acid-modified ionomer discloses above. The cushion can be any carpet cushion available commercially such as urethane foam, jute, synthetic fiber, felt, foam rubber, or sponge rubber disclosed above. The cushion can have its surface or a portion thereof covered with, or in close proximity with one or more film layer of the fatty acid-modified ionomer, optionally blended or coextruded with an ethylene-containing polymer layer that is also in close proximity with the fatty acid-modified ionomer layer. Close proximity means that there is no measurable distance, or a distance that is about 0.001 to about 50 or about 0.01 to about 20 mm, between the additional layer and the fatty acid-modified ionomer layer. The layer of the composition, whether coextruded with the layer of the ethylene-containing polymer layer, can be formed between the carpet and the cushion.

EXAMPLES

FA-modified Ionomer 1: an ionomer composition containing about 38% stearic acid; the ionomer was derived from ethylene, n-butyl acrylate, and acrylic acid; and 97.7% of all acid groups were neutralized with Mg ion.

HYTREL: an elastomeric material (butylene/poly(alkylene ether) phthalate copolymer) available from DuPont.

ELVALOY AC1609: an ethylene methyl acrylate copolymer (9 weight % methyl acrylate) from DuPont.

FA-modified Ionomer 2: an ionomer containing 21% stearic acid and compounded with 24% Elvaloy AC 12024; the ionomer was derived from ethylene, isobutyl acrylate and methacrylic acid; and 70% of all acid groups are neutralized with Mg ion.

ELVALOY AC12024: an ethylene methyl acrylate copolymer (24 weight % methyl acrylate) from DuPont.

CONPOL 5B10S1: a concentrated masterbatch available from DuPont and made from ethylene methacrylic acid carrier with 5% antiblock and 10 wt % slip agent; used to modify the surface property of polymer film or coating.

Invention Film: A composition containing the FA-modified Ionomer 1 and ELVALOY AC 1609 was produced by coextruding the ionomer and ethylene acrylate copolymer in an extruder. Coextruded structure contained 0.3 mils ELVALOY with 0.8 mils FA-modified Ionomer 1 . The temperature (° C.) profile of the extruder is shown in the following table.

|         |     |     |
|---------|-----|-----|
| Rear    | 166 | 150 |
| Center  | 168 | 160 |
| Front   | 221 | 170 |
| Head    | 221 |     |
| Adapter | 221 | 180 |
| Melt    | 246 | 180 |
| Die 1   | 221 |     |
| Die 2   | 221 |     |
| Die 3   | 221 |     |
| Die 4   | 221 |     |

A carpet cushion was formed by laying the coextruded structure as barrier film layer over a cushion formed from polyurethane foam. The cushion was then processed in the normal fashion such that the FA-modified Ionomer 1 film was firmly bonded directly to the cushion.

Control 1 Film: Same as above, except that the barrier film was made from a blend of HYTREL and ELVALOY AC1609.

Control 2 Film: The film was a commercially available polypropylene film that appeared a coextruded film containing 0.95 mils polypropylene, 0.39 mils polyethylene, and 0.36 mils ethylene vinyl acetate copolymer. Control 2 film is a commercial barrier film used in carpet pad.

The result shown in the following table indicate that the physical properties and barrier properties of the invention film were either comparable to, or better than the commercially available carpet pad barrier film and were far better than the control film using a mixture of polypropylene and ethylene vinyl acetate.

|                                            | Film Composition |               |           |
|--------------------------------------------|------------------|---------------|-----------|
|                                            | Invention        | Control 1     | Control 2 |
| Physical Property                          |                  |               |           |
| COF[A] (g); film to film                   |                  |               |           |
| Static                                     | 3.5              | 0.64          | 0.61      |
| Dynamic                                    | 2.8              | 0.68          | 0.51      |
| Gelbo Flex Test[B] (number of pinholes)    |                  |               |           |
| 1000 (cycles)                              | 0                | 0             | 0         |
| 3000 (cycles)                              | 0                | 0             | 0         |
| 5000 (cycles)                              | 0                | 0             | 0         |
| Barrier Property                           |                  |               |           |
| WVTR[C] (g/m²/day)                         | 90               | 286           | 15        |
| WVTR[C] (mil-g/m²/day)                     | 152              | 308           | 25        |
| OTR[D] (g/m²/day)                          | 17547 (17192)    | 13741         | 4029      |
| OTR[D] (mil-g/m²/day)                      | 37779 (38438)    | 16142         |           |

[A]COF was done according to ASTM D1894.
[B]Test was carried out according to ASTM F392.
[C]WVTR was measured at 38 C./100% RH.
[D]OTR was measured at 38 C./50% RH.

Separately, a coextruded film, as described above, was made from composition containing FA-modified Ionomer 2 with CONPOL 5B10S1. The film was layered on a polyurethane foam to make a carpet cushion as disclosed above. The cushion was tested for printability.

Printability testing was done using an IGT Printability Tester with alcohol-based flexographic ink according to the following procedure. A substrate was attached to a carrier and placed on the substrate guide, between the printing form and the impression cylinder. When the Tester was activated, the anilox disc and the substrate came into contact with the printing form and the doctor blade contacted the anilox. With the aid of a pipette, a few drops of ink were applied to the nip between the doctor blade and the anilox. During the print the ink was wiped off and transferred from the anilox disc to the printing form and from the printing form to the substrate. Doctor blade, anilox disc and impression cylinder were then lifted automatically. The substrate was removed for appraisal.

Visual observation showed excellent print quality.

|                                     | Example 1 | Example 2 | Example 3 | Control 1 |
|-------------------------------------|-----------|-----------|-----------|-----------|
| FA-modified Ionomer 2               | 100%      | 95%       | 90%       |           |
| CONPOL 5B10S1                       | 0         | 5%        | 10%       |           |
| Wetting Tension[A]; outside of film |           |           |           |           |
| HYTREL side                         |           |           |           | 32        |
| ELVALOY side                        |           |           |           | <32       |
| Initial                             |           | 37        | 32        |           |
| 2 weeks                             | 0         | 37        | 32        |           |
| Corona-treated film[B]              | 38        | 34        | 37        |           |

[A]Wetting tension was measured according to ASTM D2578.
[B]Corona treatment was done to raise surface tension, thereby improving the film's receptivity to bonding with printing inks. Treatment was applied by passing the film over a roller through an air gap between an electrode and a grounding roll at a power setting of 12 watts/square foot/min

The invention claimed is:

1. A carpet cushion comprising a film or sheet wherein
the film or sheet is attached to, or in contact with, the carpet cushion;
the film of sheet comprises a composition;
the composition comprises or is produced from a fatty acid-modified ionomer and optionally an ethylene-containing polymer;
the fatty acid-modified ionomer comprises or is produced from an acid copolymer and a fatty acid;
the acid copolymer comprises repeat unites derived from ethylene, an unsaturated carboxylic acid, and optionally a softening monomer;
the carboxylic acid includes (meth)acrylic acid, maleic acid, fumaric acid, itaconic acid, maleic anhydride, fumaric anhydride, maleic acid, maleic half ester, or combinations of two or more thereof;
the acid moiety of the acid copolymer, the fatty acid, or both is partially or fully neutralized with a metal ion; and
the ethylene-containing polymer includes one or more polymers comprising repeat units derived from ethylene and optionally vinyl acetate, alkyl (meth)acrylate, carbon monoxide, maleic anhydride, maleic acid derivative, or combinations of two or more thereof.

2. The carpet cushion of claim 1 wherein about 100% of acid moiety of the acid copolymer and the fatty acid is neutralized; and the fatty acid is one or more $C_6$ to $C_{26}$ fatty acids.

3. The carpet cushion of claim 1 wherein
the fatty acid is one or more $C_6$ to $C_{26}$ fatty acids;
the film or sheet is in contact with the carpet cushion;
the acid copolymer includes ethylene/(meth)acrylic acid copolymer, ethylene/(meth)acrylic acid/n-butyl (meth)acrylate copolymer, ethylene/(meth)acrylic acid/iso-butyl (meth)acrylate copolymer, ethylene/(meth)acrylic acid/tert-butyl (meth)acrylate copolymer, ethylene/(meth)acrylic acid/methyl (meth)acrylate copolymer, ethylene/(meth)acrylic acid/ethyl (meth)acrylate copolymer, ethylene/maleic acid and ethylene/maleic acid monoester copolymer, ethylene/maleic acid monoester/n-butyl (meth)acrylate copolymer, ethylene/maleic acid monoester/methyl (meth)acrylate copolymer, ethylene/maleic acid monoester/ethyl (meth)acrylate copolymer, or combinations of two or more thereof; and
the ethylene-containing polymer includes ethylene vinyl acetate copolymer, ethylene methyl acrylate copolymer, ethylene methacrylate copolymer, ethylene ethyl acrylate copolymer, ethylene butyl acrylate copolymer, or combinations of two or more thereof.

4. The carpet cushion of claim 2 wherein
the acid copolymer comprises repeat unites derived from ethylene and (meth)acrylic acid; and
the ethylene-containing polymer includes ethylene vinyl acetate copolymer.

5. The carpet cushion of claim 4 wherein and the metal ion is Mg ion.

6. The carpet cushion of claim 4 wherein the fatty acid is one or more of $C_6$ to $C_{12}$ fatty acids.

7. The carpet cushion of claim 4 wherein the composition comprises the ethylene-containing polymer or is a blend of the fatty acid-modified ionomer and the ethylene-containing polymer.

8. The carpet cushion of claim 4 wherein the composition is coextruded with an ethylene-containing polymer to produce a multilayer film and the ethylene-containing polymer includes ethylene vinyl acetate copolymer, ethylene methyl acrylate copolymer, ethylene methacrylate copolymer, ethylene ethyl acrylate copolymer, ethylene butyl acrylate copolymer, or combinations of two or more thereof.

9. The carpet cushion of claim 3 wherein
the acid copolymer comprises repeat unites derived from ethylene and (meth)acrylic acid; and
the ethylene-containing polymer includes ethylene methyl acrylate copolymer, ethylene methacrylate copolymer, ethylene ethyl acrylate copolymer, ethylene butyl acrylate copolymer, or combinations of two or more thereof.

10. The carpet cushion of claim 9 wherein the ethylene-containing polymer includes ethylene methyl (meth)acrylate copolymer.

11. The carpet cushion of claim 10 wherein the composition comprises the ethylene-containing polymer or is a blend of the fatty acid-modified ionomer and the ethylene-containing polymer.

12. The carpet cushion of claim 10 wherein the composition is coextruded with an ethylene-containing polymer to produce a multilayer film and the ethylene-containing polymer includes ethylene vinyl acetate copolymer, ethylene methyl acrylate copolymer, ethylene methacrylate copolymer, ethylene ethyl acrylate copolymer, ethylene butyl acrylate copolymer, or combinations of two or more thereof.

13. The carpet cushion of claim 10 wherein about 100% moiety of the acid copolymer, the fatty acid is neutralized.

14. The carpet cushion of claim 10 wherein the fatty acid is one or more of $C_6$ to $C_{12}$ fatty acids.

15. An article comprising a carpet and a cushion wherein
the cushion comprises a film or sheet;
the film or sheet is attached to, or in contact with, the cushion;
the film of sheet comprises a composition;
the composition comprises or is produced from a fatty acid-modified ionomer and optionally an ethylene-containing polymer;
the fatty acid-modified ionomer comprises or is produced from an acid copolymer and a fatty acid;
the acid copolymer comprises repeat unites derived from ethylene, an unsaturated carboxylic acid, and optionally a softening monomer;
the carboxylic acid includes (meth)acrylic acid, maleic acid, fumaric acid, itaconic acid, maleic anhydride, fumaric anhydride, maleic acid, maleic half ester, or combinations of two or more thereof;
the acid moiety of the acid copolymer, the fatty acid, or both is partially or fully neutralized with a metal ion; and
the ethylene-containing polymer includes one or more polymers comprising repeat units derived from ethylene and optionally vinyl acetate, alkyl (meth)acrylate, carbon monoxide, maleic anhydride, maleic acid derivative, or combinations of two or more thereof.

16. The carpet of claim 15 wherein about 100% of the acid copolymer and the fatty acid is neutralized.

17. The carpet of claim 15 wherein
the fatty acid is one or more $C_6$ to $C_{18}$ fatty acids;
the acid copolymer comprises repeat unites derived from ethylene and (meth)acrylic acid; and
the ethylene-containing polymer includes ethylene vinyl acetate copolymer or ethylene methyl (meth)acrylate copolymer.

18. The carpet of claim 17 wherein the acid copolymer includes ethylene/(meth)acrylic acid copolymer.

19. An article carpet having attached thereto or in contact therewith a film or sheet wherein
the article is a carpet cushion;
the film of sheet comprises or is produced from a fatty acid-modified ionomer and optionally an ethylene-containing polymer;
the fatty acid-modified ionomer comprises or is produced from an acid copolymer and one or more $C_6$ to $C_{26}$ fatty acids;
the acid copolymer includes ethylene/(meth)acrylic acid copolymer, ethylene/(meth)acrylic acid/n-butyl (meth)acrylate copolymer, ethylene/(meth)acrylic acid/iso-butyl (meth)acrylate copolymer, ethylene/(meth)acrylic acid/tert-butyl (meth)acrylate copolymer, ethylene/(meth)acrylic acid/methyl (meth)acrylate copolymer, ethylene/(meth)acrylic acid/ethyl (meth)acrylate copolymer, ethylene/maleic acid and ethylene/maleic acid monoester copolymer, ethylene/maleic acid monoester/n-butyl (meth)acrylate copolymer, ethylene/maleic acid monoester/methyl (meth)acrylate copolymer, ethylene/maleic acid monoester/ethyl (meth)acrylate copolymer, or combinations of two or more thereof;
the carboxylic acid includes (meth)acrylic acid, maleic acid, fumaric acid, itaconic acid, maleic anhydride, fumaric anhydride, maleic acid, maleic half ester, or combinations of two or more thereof;
the acid moiety of the acid copolymer, the fatty acid, or both is partially or fully neutralized with a metal ion; and
the ethylene-containing polymer includes ethylene vinyl acetate copolymer, ethylene methyl acrylate copolymer, ethylene methacrylate copolymer, ethylene ethyl acrylate copolymer, ethylene butyl acrylate copolymer, or combinations of two or more thereof.

20. The article of claim 19 wherein
the fatty acid is one or more of $C_6$ to $C_{12}$ fatty acids;
the acid copolymer comprises repeat unites derived from ethylene and (meth)acrylic acid; and
the ethylene-containing polymer includes ethylene vinyl acetate copolymer.

21. The article of claim 20 wherein the metal ion is Mg ion.

22. The article of claim 20 wherein the film or sheet comprises the ethylene-containing polymer or a blend of the fatty acid-modified ionomer and the ethylene-containing polymer; and the ethylene-containing polymer is selected from the group consisting of ethylene vinyl acetate copolymer, ethylene methyl acrylate copolymer, ethylene methacrylate copolymer, ethylene ethyl acrylate copolymer, ethylene butyl acrylate copolymer, and combinations of two or more thereof.

* * * * *